United States Patent [19]

Cramer, Jr.

[11] 4,014,526
[45] Mar. 29, 1977

[54] LIQUID MOVING AND MIXING APPARATUS

[76] Inventor: Roy A. Cramer, Jr., 8100 Paseo, Kansas City, Mo. 64131

[22] Filed: Apr. 26, 1976

[21] Appl. No.: 680,519

[52] U.S. Cl. .................................... 259/24; 259/8
[51] Int. Cl.² ..................... B01F 7/22; B01F 15/02
[58] Field of Search ............. 259/107, 108, 23, 24, 259/122, 8; 261/83, 85; 416/188

[56] References Cited

UNITED STATES PATENTS

| 3,341,450 | 8/1967 | Ciabattari et al. ............. 259/107 X |
| 3,457,047 | 7/1969 | Tokimatsu et al. ............. 259/24 X |
| 3,488,038 | 1/1970 | Staaf ............................. 259/108 X |
| 3,635,448 | 1/1972 | Okada ............................. 259/108 |

Primary Examiner—Billy S. Taylor
Attorney, Agent, or Firm—Fishburn, Gold & Litman

[57] ABSTRACT

A liquid moving and mixing apparatus is selectively submersible in a body of liquid and is operative to effect a turbulent flow of the liquid upwardly and then outwardly and then downwardly and to mix a selected material into the body of liquid during the upwardly and outwardly flow of the liquid. The liquid moving and mixing apparatus includes a propeller rotated by a submersible motor carried on a portion of a frame structure extending upwardly from a ballast member. The propeller directs the flow of liquid upwardly toward a downwardly directed apex of a cone-shaped diffusing member which directs the flow upwardly and outwardly toward a deflector member which deflects the flow outwardly and downwardly. Liquid flow by the diffusing member cooperates with and/or induces a flow of a selected material outwardly through an annular orifice in the diffusing member adjacent to and spaced from the apex thereof to mix said material into the body of liquid during the flow effected therein.

15 Claims, 5 Drawing Figures

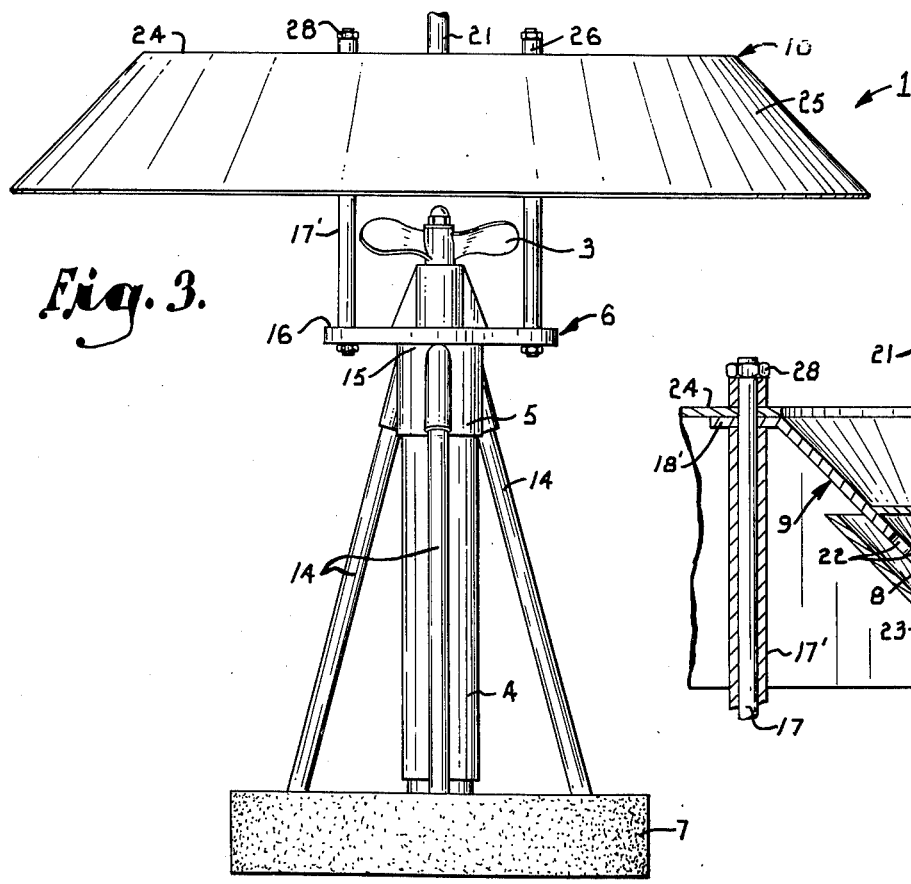
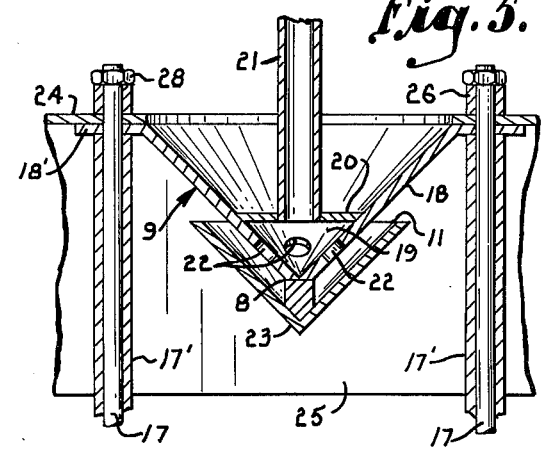
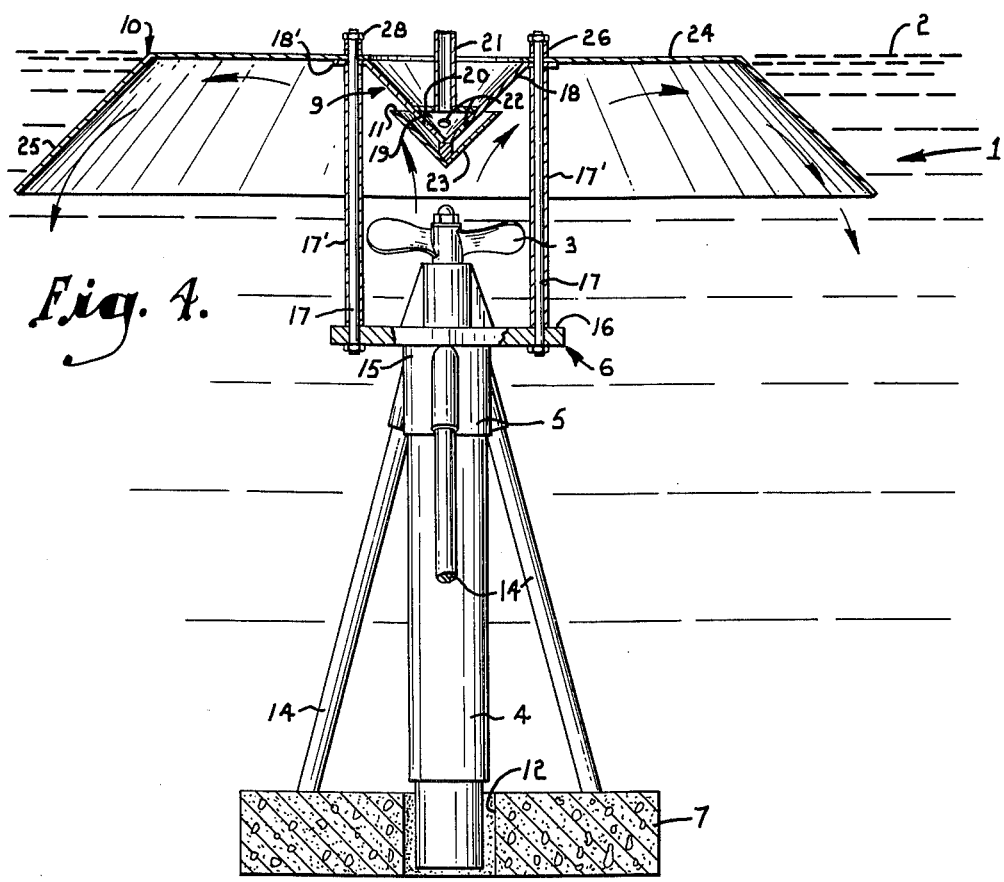

LIQUID MOVING AND MIXING APPARATUS

The present invention relates to a liquid moving and mixing apparatus and more particularly to a liquid moving and mixing apparatus capable of thoroughly mixing the selected material with the liquid of the body of liquid.

The principal objects of the present invention are: to provide a liquid moving and mixing apparatus capable of moving portions of a body of liquid in an upwardly and outwardly direction and then in a downwardly direction and introduce a treating material therein; to provide such a liquid moving and mixing apparatus which provides a turbulent flow of the liquid and introduces into said flow a selected fluid, such as a liquid or gas, to thoroughly mix same into the body of liquid; to provide such an apparatus that when the fluid is a gaseous material, bubbles are fragmented to substantially pinpoint size thereby creating maximum interface; to provide such a liquid moving and mixing apparatus wherein the mixing flow is effected by upward action of a propeller and by a horizontal deflector member with an outwardly and downwardly extending side wall; to provide such an apparatus having a novel structure forming a venturi-educator arrangement for introducing the selected fluid into the flowing liquid; to provide such a liquid moving and mixing apparatus having a flow diffusing member providing minimum resistance while diverting liquid flow from vertically upward to an outwardly direction and then outwardly and downwardly by a side wall of a novel deflector member; to provide such an apparatus that when air or gas is to be mixed with the liquid same tends to remain entrained in the liquid of the body of liquid rather than having many bubbles quickly coming to the surface of the liquid; and to provide such a liquid moving and mixing apparatus which is economical to manufacture, durable in construction, stable in use in all climatic conditions, reliable and positive in operation, easily serviced, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the liquid moving and mixing apparatus.

FIG. 3 is a side elevational view of the liquid moving and mixing apparatus.

FIG 4 is a vertical sectional view through the liquid moving and mixing apparatus and taken on line 4—4 of FIG. 2.

FIG. 5 is an enlarged fragmentary vertical sectional view through a diffuser and cap member thereon and showing a treating material chamber within the diffuser.

Figure 1:
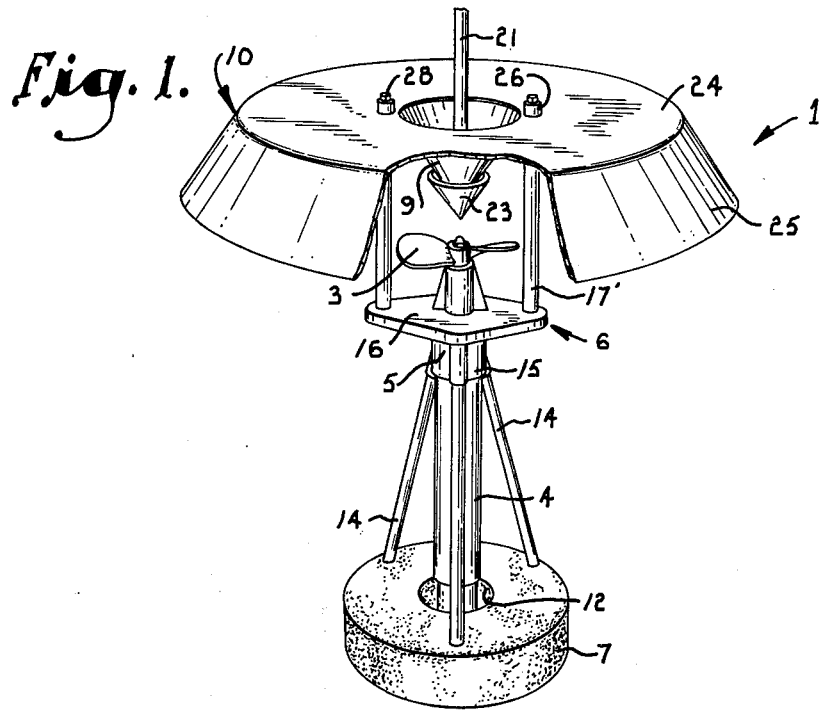
FIG. 1 is a perspective view of a liquid moving and mixing apparatus embodying features of the present invention.
Figure 2:
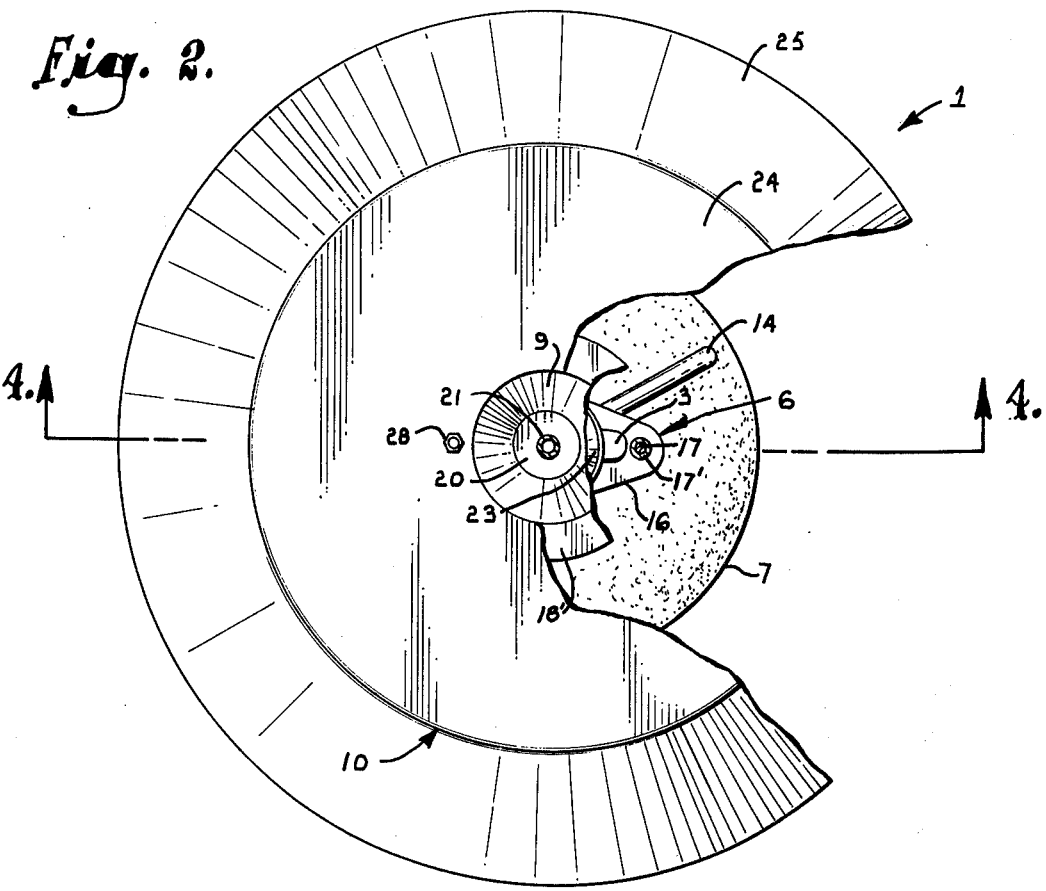
FIG. 2 is a top plan view of the liquid moving and mixing apparatus with portions broken away to better illustrate the component parts thereof.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a liquid moving and mixing apparatus which is submersible in a body of liquid 2 and is operative to effect a turbulent flow of the liquid upwardly and then outwardly and then downwardly and to mix a selected material into the body of liquid 2 during such flow. The apparatus 1 includes a propeller 3 rotated by a submersible motor 4 carried on a portion 5 of a frame structure 6 extending upwardly from a ballast member 7. The propeller 3 directs flow of liquid upwardly toward a downwardly directed apex 8 of a diffusing member 9 which directs the flow toward a deflector member 10 which deflects the flow outwardly and downwardly. Liquid flow around the diffusing member 9 cooperates with a flow of a selected material outwardly through a suitable orifice or orifices 11 and into the body of liquid 2 so that the liquid and material mix together during said turbulent flow.

The ballast member 7 may be any suitable member or structure having sufficient weight and mass to provide stability for the liquid moving and mixing apparatus 1 when submerged within the body of liquid 2. The ballast member may be a combination of a member having slight bouyance and an anchor or weight for selectively positioning the structure in a body of liquid with the propeller 3, diffusing member 9, and deflecting member 10 at a desired depth below the surface of said body of liquid. In the illustrated embodiment, the ballast member 7 is an annular ring of dense material, such as concrete or the like, providing a base for the liquid moving and mixing apparatus 1. A center aperture 12 in the ballast member or ring 7 permits the lower end portion of the submersible motor 4 to extend therein if the heighth limits are small.

The particular frame structure 6 illustrated is mounted on the ballast member 7 and extends upwardly therefrom and has the submersible motor 4 mounted thereon by a suitable connection between the upper end portion 5 of the frame structure 6 and upper portion of the motor 4. In the illustrated embodiment, the frame structure 6 includes a plurality of circumferentially spaced support legs 14 each having a lower end portion secured on the ballast member 7. The frame structure 6 includes a motor mounting portion 15 with an upper end portion of the support legs 14 secured thereto. The diffusing member 9 and deflector member 10 are preferably supported from the frame 6 to provide a complete unitary assembly. In the illustrated structure, a deck member or portion 16 is mounted on and extends outwardly from the motor mounting portion 15 to provide support for the diffusing member 9 and the deflector member 10. In the illustrated embodiment, a plurality of circumferentially spaced posts 17 are mounted on and extend upwardly from the deck member 16 to support the diffusing member 9 and the deflector member 10, as later described. The posts 17 are spaced from the propeller 3 a suitable distance which will allow solid objects to pass between the propeller 3 and the posts 17. Upper end portions of the posts 17 are threaded to receive suitable nuts.

The propeller 3 is preferably a hard chromed member designed for the specific function of effecting an upwardly flow of the liquid 2 toward the diffusing member 9. It is preferred that a bearing for the propeller 3 be completely independent of motor bearings. The propeller 3 has a shaft (not shown) which is received in a journal which is preferably hard chromed and bourne by a liquid lubricating cutlass type bearing capable of absorbing substantially all radial and shock-loads thereby protecting the motor bearings.

The diffusing member 9 is mounted on the posts 17 of the frame structure 6 and is positioned above and axially aligned with the propeller 3. The diffusing member 9 shown is coned-shaped to provide minimum resistance while diffusing or diverting the liquid flow from vertically upward to an upwardly and outwardly direction thereby optimizing dispersion of mixed material, such as solids, liquids, or gas. The diffusing member 9 has an included angle in the range of between 60° to 90°. A suitable material for the diffusing member 9 is a monolithic aluminum alloy which is epoxy encapsulated for further protection. The diffusing member 9 has the downwardly directed portion, point or apex 8 above and axially aligned with the propeller shaft. The diffusing member 9 has a wall 18 defining the cone-shape and at the upper end thereof terminates in an outwardly and horizontally extending flange 18'. The posts 17 are elongated bolts or rods secured to the deck and extending through apertures in said flange 18' with tubular spacers 17' sleeved on the rods with ends engaging said deck and flange. Fasteners, such as nuts, are on the upper ends of rods to hold the diffusing member and frame together with the apex of the diffuser properly spaced from the propeller.

A selected material to be mixed with the liquid 2 of a body of liquid is communicated to a fluid or material receiving chamber 19 within the diffusing member 9. In the illustrated embodiment, the diffusing member 9 is upwardly open and has a closure partition 20 spaced from the lower or downwardly directed point or apex and secured to the wall member 18 defining the diffusing member 9. The closure partition 20 is generally horizontally and has a lower end portion of a tubular flow member 21, such as a pipe or hose, mounted thereon for flow of the selected material from a suitable source of supply to the material receiving chamber 19 in the diffusing member 9. The treating material is preferably stored in a suitable receptacle, reservoir, container, tank, or the like. The portion of the wall 18 of the diffusing member 9 between the closure partition 20 and the downwardly directed point or apex 8 has a plurality of circumferentially spaced ports 22 for flow therethrough of the treating material from the material receiving chamber 19.

A venture eductor forming member in the form of a cone-shaped cap or second diffusing member 23 is mounted on the previously described diffusing member 9 and defines the annular orifice 11 surrounding the first described diffusing member 9. The second diffusing or cap member 23 is spaced from the wall 18 of the first described diffusing member 9 thereby defining a space or means communicating the ports 22 with the annular orifice 11 for flow of the selected material between the material receiving chamber 19 and the annular orifice 11 in response to upwardly directed flow effected by the propeller 3 whereby the selected material is mixed with the liquid 2 of the body of liquid.

The illustrated cap member 23 has a wall that has an angular relation or included angle corresponding to that of the diffuser wall 18 and preferably spaced from and parallel therewith. The upper end or edge of the cap wall extends above the discharge apertures or ports 22. The diffuser wall 18 and the wall of the cap member 23 cooperate to define an annular venture passage arranged so that flow of liquid past the annular orifice 11 will draw the treating material from the chamber 19 into the turbulent liquid flow. The cap member 23 is coaxial with the diffuser wall 18 and surrounds the portion of the diffusing member 9 adjacent the apex 8 thereof.

The deflector member 10 is mounted on the upper end of the posts 17 and positioned above the diffusing member 9 and the second diffusing or cap member 23 thereon. The deflector member 10 has a top wall 24 in engagement with the diffuser flange 18' and a side wall 25 extending outwardly and downwardly from a periphery of the top wall 24 whereby the flow of liquid 2 and selected material is deflected outwardly and downwardly.

In the illustrated embodiment, the flange 18' of the diffusing member 9 has a plurality of apertures therein each adapted to receive therein a respective one of the posts 17. The top wall 24 of the deflector member 8 also has a like plurality of apertures therein and each adapted to receive therein a respective one of the posts 17. A plurality of guide sleeves 26 are mounted on an upper surface of the top wall 24 and aligned with a respective one of the post receiving apertures therein. Each of the posts 17 has a sleeve 17' mounted thereon with a lower end thereof supported on the deck member 16 and an upper end having the flange 18' of the diffusing member 9 supported thereon. The posts 17 extend through the respective apertures in the diffuser flange 18' and deflector member top wall 24 and guide sleeves 26 thereon. Suitable washers and nuts 28 are mounted on respective upper end portions of the posts 17 and when tightened hold the deflector member 10 and diffusing member 9 in clamped engagement with the upper end of the sleeves 17' on the posts 17.

The top wall 24 of the deflector member 10 has a diameter in the nature of four times that of the top or upper end of diffusing member 9. The outwardly and downwardly sloping side wall 25 of the deflector member 10 has a lower edge positioned below the lower end of the cap member 23 and adjacent the level of the propeller 3.

In using a liquid moving and mixing apparatus constructed as illustrated and described, the apparatus 1 is placed in a reservoir, tank, or the like having a liquid therein which is desired to be circulated and to mix a selected material with the liquid during circulation thereof. The reservoir tank or the like may be filled with the liquid 2 before or after placing the apparatus 1 therein. The motor 4 is activated to drive the propeller 3 which effects upwardly vertical flow of the liquid 2 toward the downwardly directed point or portion 8 of the diffusing member 9 which changes the flow from vertically upward to upwardly and outwardly. The flow then engages the flange 18' of the diffusing member 9 and the top wall 24 of the deflector member 10 which deflects the flow outwardly toward the deflector side wall 25 which in turn deflects the flow downwardly. The selected material flows through the tubular member 21 by pressure or by gravity to the material receiving chamber 19. The material then flows outwardly through the ports 22 into the space between the second diffusing or cap member 23 and the first described diffusing member 9. The material then flows outwardly through the annular orifice 11 which defines a venturi-eductor arrangement. The flow around the second diffusing or cap member 23 and the first described diffusing member 9 effects a thorough mixing of the selected material with the liquid 2 of the body of liquid. The side wall 25 of the deflector member 10 directs the mixed material and liquid downwardly and outwardly while the propeller 3 is effecting an upwardly vertical flow toward the lower end of the second diffusing or cap member 23.

The liquid moving and mixing apparatus 1 may be inverted in the body of liquid 2 in the reservoir, tank, or the like. The operation of the apparatus will be the same as previously described except that the mixing flow will be downwardly toward the apex 8 of the cone-shaped diffusing member 9 which directs the flow downwardly and outwardly toward the deflector member 10 which deflects the flow outwardly and upwardly.

It is to be understood that while I have illustrated and described one form of my invention, it is not to be limited to the specific form or arrangement of parts herein described and shown.

What I claim and desire to secure by Letters Patent is:

1. A liquid moving apparatus comprising:
    a. a ballast member;
    b. a frame structure mounted on said ballast member and extending upwardly therefrom and having an upper end portion;
    c. a submersible motor mounted on said frame structure and positioned adjacent the upper end portion thereof;
    d. a propeller rotated by said submersible motor to effect an upwardly directed flow in a body of liquid;
    e. a diffusing member mounted on said frame structure and positioned above said propeller, said diffusing member being cone-shaped to diffuse the flow upwardly and outwardly; and
    f. a deflector member mounted on said frame structure and positioned above said diffusing member, said deflector member having a top wall and a side wall extending outwardly and downwardly from said top wall to deflect the flow outwardly and downwardly.

2. A liquid moving apparatus as set forth in claim 1 including:
    a. means on said diffusing member defining a fluid receiving chamber therein;
    b. means for communicating to the fluid receiving chamber within said diffusing member a supply of fluid to be mixed into the body of liquid; and
    c. means on said diffusing member for defining an annular orifice surrounding said diffusing member and means communicating between the fluid receiving chamber of said diffusing member and the annular orifice for flow of fluid therebetween and outwardly through said annular orifice in response to the upwardly directed flow effected by said propeller whereby the fluid is mixed with the liquid in the body of liquid.

3. A liquid moving apparatus as set forth in claim 1 including:
    a. means on said diffusing member defining a fluid receiving chamber therein;
    b. means for communicating to the fluid receiving chamber within said diffusing chamber a supply of fluid to be mixed into the body of liquid;
    c. a cap member mounted on said diffusing member and positioned above said propeller, said cap member being spaced from and surrounding a portion of said diffusing member thereby defining an annular orifice surrounding said diffusing member; and
    d. means communicating between the fluid receiving chamber of said diffusing member and the annular orifice for flow of the fluid therebetween and outwardly through said annular orifice in response to the upwardly directed flow effected by said propeller whereby the fluid is mixed with the liquid in the body of liquid.

4. A liquid moving apparatus as set forth in claim 1 wherein said frame structure includes:
    a. a motor mounting portion having said submersible motor mounted thereon;
    b. a plurality of circumferentially spaced support legs each extending between said ballast member and said motor mounting portion;
    c. a deck member mounted on and extending outwardly from said motor mounting portion; and
    d. a plurality of circumferentially spaced posts extending upwardly from said deck member and having said diffusing member and said deflector member supported thereon.

5. A liquid moving apparatus as set forth in claim 4 including:
    a. means on said diffusing member defining a fluid receiving chamber therein;
    b. fluid supply means communicating to the fluid receiving chamber within said diffusing member a supply of fluid to be mixed into the body of liquid;
    c. a cap member mounted on said diffusing member and positioned above said propeller, said cap member being spaced from and surrounding a portion of said diffusing member thereby defining an annular orifice surrounding said diffusing member; and
    d. means communicating between the fluid receiving chamber of said diffusing member and the annular orifice for flow of the fluid therebetween and outwardly through said annular orifice in response to the upwardly directed flow effected by said propeller whereby the fluid is mixed in the body of liquid.

6. A liquid mixing apparatus comprising:
    a. a ballast member;
    b. a frame structure mounted on said ballast member and extending upwardly therefrom and having an upper end portion;
    c. a submersible motor mounted on said frame structure and positioned adjacent the upper end portion thereof;
    d. a propeller rotated by said submersible motor to effect an upwardly directed flow in a body of liquid;
    e. a diffusing member mounted on said frame structure and positioned above said propeller, said diffusing member having a fluid receiving chamber therein, said diffusing member being cone-shaped to diffuse the flow upwardly and outwardly;
    f. means for communicating to the fluid receiving chamber within said diffusing member a supply of fluid to be mixed into the body of liquid; and
    g. means on said diffusing member for defining an annular orifice surrounding said diffusing member and means communicating between the fluid receiving chamber of said diffusing member and the annular orifice for flow of fluid therebetween and outwardly through said annular orifice in response to the upwardly flow effected by said propeller whereby the fluid is mixed with the liquid in the body of liquid.

7. A liquid mixing apparatus as set forth in claim 6 including a deflector member mounted on said frame structure and positioned above said diffusing member, said deflector member having a top wall and a side wall extending outwardly and downwardly from said top wall to deflect the flow of liquid outwardly and downwardly.

8. A liquid mixing apparatus as set forth in claim 6 wherein:
   a. said diffusing member has a downwardly directed apex;
   b. said means for defining an annular orifice includes a cap member mounted on said diffusing member and positioned above said propeller;
   c. said cap member is spaced from and surrounds a portion of said diffusing member including the downwardly directed apex thereof; and
   d. said means communicating between the fluid receiving chamber of said diffusing member and the annular orifice includes a plurality of circumferentially spaced ports in said diffusing member and positioned adjacent the downwardly directed apex of said diffusing member and communicating with the space between said diffusing member and communicating with the space between said diffusing member and said cap member.

9. A liquid mixing apparatus as set forth in claim 8 wherein said frame structure includes:
   a. a motor mounting portion having said submersible motor mounted thereon;
   b. a plurality of circumferentially spaced support legs each extending between said ballast member and said motor mounting portion;
   c. a deck member mounted on and extending outwardly from said motor mounting portion; and
   d. a plurality of circumferentially spaced posts extending upwardly from said deck member and having said diffusing member supported thereon.

10. A liquid mixing apparatus as set forth in claim 9 including a deflector member mounted on said frame structure and positioned above said diffusing member, said deflector member having a top wall and a side wall extending outwardly and downwardly from said top wall to deflect the flow of liquid outwardly and downwardly.

11. A mixing apparatus for mixing treating materials into liquid of a body of liquid, said mixing apparatus comprising:
   a. a liquid flow diffuser having a wall defining an inverted cone with an apex;
   b. means in said diffuser defining a treating material chamber therein adjacent the apex, said diffuser wall having a plurality of apertures adjacent said apex and communicating with said chamber;
   c. a cone-shaped cap member secured to said diffuser in surrounding relation to the apex thereof and having a wall spaced from the wall of said diffuser and extending above said apertures to define an annular venturi passage between said diffuser and said cap member, the venturi passage terminating in an annular venturi opening;
   d. a submersible motor and a propeller driven thereby;
   e. means supporting said motor and propeller below and in axial relation to said diffuser to effect a liquid flow past the annular venturi opening to draw treating material from said chamber into the liquid flow; and
   f. means positioning said diffuser and motor in a body of liquid below the surface thereof.

12. A mixing apparatus as set forth in claim 11 including a deflector mounted on said diffuser and having a wall extending outwardly and downwardly therefrom to deflect upward liquid flow from around said diffuser to outwardly and downwardly therefrom.

13. A mixing apparatus as set forth in claim 11 wherein said means supporting said motor and propeller below and in axial relation to said diffuser includes:
   a. a ballast member; and
   b. a frame structure mounted on said ballast member and extending upwardly therefrom, said frame structure including:
      1. a motor mounting portion having said submersible motor mounted thereon;
      2. a plurality of circumferentially spaced support legs each extending between said ballast member and said motor mounting portion;
      3. a deck member mounted on and extending outwardly from said motor mounting portion; and
      4. a plurality of circumferentially spaced posts extending upwardly from said deck member and having said diffuser mounted thereon.

14. A mixing apparatus as set forth in claim 11 including:
   a. an outwardly extending flange mounted on said diffuser and positioned adjacent an upper end thereof; and
   b. a deflector mounted on said flange of said diffuser and having a wall extending outwardly and downwardly to deflect upward liquid flow from around said diffuser to outwardly and downwardly therefrom, said deflector wall having a lower edge positioned below said cap member and adjacent said propeller.

15. A mixing apparatus as set forth in claim 14 wherein said means supporting said motor and propeller below and in axial relation to said diffuser includes:
   a. a ballast member; and
   b. a frame structure mounted on said ballast member and extending upwardly therefrom, said frame structure including:
      1. a motor mounting portion having said submersible motor mounted thereon;
      2. a plurality of circumferentially spaced support legs each extending between said ballast member and said motor mounting portion;
      3. a deck member mounted on and extending outwardly from said motor mounting portion; and
      4. a plurality of circumferentially spaced posts extending upwardly from said deck member and having said diffuser and said deflector mounted thereon.

* * * * *